United States Patent
Ridge

(10) Patent No.: US 12,465,325 B2
(45) Date of Patent: Nov. 11, 2025

(54) ULTRASONIC ENDOCAVITARY IMAGING SYSTEM AND METHOD

(71) Applicant: VisOvum Ltd., Norwich (GB)

(72) Inventor: Yvonne Ridge, Norwich (GB)

(73) Assignee: VisOvum Ltd., Norwich (GB)

( * ) Notice: Subject to any disclaimer, the term of this patent is extended or adjusted under 35 U.S.C. 154(b) by 0 days.

(21) Appl. No.: 17/976,698

(22) Filed: Oct. 28, 2022

(65) Prior Publication Data

US 2023/0139828 A1    May 4, 2023

Related U.S. Application Data

(60) Provisional application No. 63/272,789, filed on Oct. 28, 2021.

(51) Int. Cl.
*A61B 8/12* (2006.01)
*A61B 8/00* (2006.01)

(52) U.S. Cl.
CPC ............. *A61B 8/12* (2013.01); *A61B 8/4483* (2013.01); *A61B 8/4444* (2013.01)

(58) Field of Classification Search
CPC ......... A61B 8/12; A61B 8/0866; A61B 8/546; A61B 8/465; A61B 8/085
See application file for complete search history.

(56) References Cited

U.S. PATENT DOCUMENTS

| | | | |
|---|---|---|---|
| 5,181,514 A * | 1/1993 | Solomon | G01S 15/8993 600/463 |
| 6,468,223 B2 | 10/2002 | Kaga | |
| 6,471,649 B1 | 10/2002 | Saccardo et al. | |
| 6,540,685 B1 | 4/2003 | Rhoads et al. | |
| 6,896,653 B1 | 5/2005 | Vail, III et al. | |
| 7,066,889 B2 | 6/2006 | Taylor | |
| 8,416,301 B2 | 4/2013 | Lindop et al. | |
| 8,543,519 B2 | 9/2013 | Guyon et al. | |
| 8,656,916 B2 | 2/2014 | Stukanov | |
| 8,679,013 B2 | 3/2014 | Ziarno et al. | |
| 8,679,014 B2 | 3/2014 | Bennett et al. | |
| 8,914,245 B2 | 12/2014 | Hopkins | |
| 9,760,990 B2 | 9/2017 | Abedini et al. | |
| 10,127,664 B2 | 11/2018 | Govindjee et al. | |

(Continued)

FOREIGN PATENT DOCUMENTS

| | | |
|---|---|---|
| AU | 2006307604 A | 5/2007 |
| AU | 2015307296 B2 | 3/2016 |

(Continued)

OTHER PUBLICATIONS

European Patent Office, International Search Report and Written Opinion for PCT application PCT/IB2022/000637, dated Feb. 24, 2023, 15 pages.

*Primary Examiner* — Anh Tuan T Nguyen
*Assistant Examiner* — Tommy T Ly
(74) *Attorney, Agent, or Firm* — Sunstein LLP

(57) ABSTRACT

A compact and discrete portable ultrasonic endocavitary imaging system for remote self-use is provided. The imaging system includes a probe, a shaft having an image capture assembly rotatably mounted within the probe, and a folding handle. Manual hand-operated rotation of the handle causes rotation of the shaft and image capture assembly, providing swept image data from the interior of a body cavity.

12 Claims, 14 Drawing Sheets

(56) References Cited

U.S. PATENT DOCUMENTS

| | | | |
|---|---|---|---|
| 10,282,835 B2 | 5/2019 | Reicher et al. | |
| 10,628,943 B2 | 4/2020 | Hsieh et al. | |
| 10,646,156 B1 | 5/2020 | Schnorr | |
| 10,734,116 B2 | 8/2020 | Chen et al. | |
| 10,799,210 B1* | 10/2020 | Zhang | A61C 9/0086 |
| 11,017,695 B2 | 5/2021 | Buras et al. | |
| 2002/0148277 A1* | 10/2002 | Umeda | A61B 8/4455 264/1.7 |
| 2004/0030581 A1* | 2/2004 | Leven | G16H 40/67 705/2 |
| 2004/0054288 A1* | 3/2004 | Nygaard | A61B 8/12 600/459 |
| 2005/0085718 A1* | 4/2005 | Shahidi | A61B 8/0833 600/443 |
| 2007/0167821 A1* | 7/2007 | Lee | A61B 8/12 600/463 |
| 2008/0228081 A1* | 9/2008 | Becker | A61B 8/4461 600/459 |
| 2008/0249360 A1 | 10/2008 | Li et al. | |
| 2009/0105597 A1* | 4/2009 | Abraham | A61B 8/445 604/95.01 |
| 2010/0041996 A1 | 2/2010 | Nygaard et al. | |
| 2011/0190595 A1 | 8/2011 | Bennett et al. | |
| 2012/0059394 A1 | 3/2012 | Brenner et al. | |
| 2013/0053657 A1* | 2/2013 | Ziarno | A61B 1/042 600/588 |
| 2014/0039277 A1 | 2/2014 | Abraham | |
| 2014/0276018 A1* | 9/2014 | Mukdadi | A61B 6/4208 600/426 |
| 2015/0374331 A1* | 12/2015 | Cho | A61B 8/4444 600/462 |
| 2016/0374652 A1* | 12/2016 | Nygaard | A61B 17/3403 600/464 |
| 2017/0360411 A1 | 12/2017 | Rothberg et al. | |
| 2018/0068083 A1 | 3/2018 | Cohen et al. | |
| 2018/0185008 A1 | 7/2018 | Andersen et al. | |
| 2018/0289357 A1 | 10/2018 | Jensen et al. | |
| 2018/0344291 A1* | 12/2018 | Martins | A61B 8/5253 |
| 2019/0072671 A1 | 3/2019 | Nikolov et al. | |
| 2019/0374193 A1 | 12/2019 | Ramachandran et al. | |
| 2020/0015785 A1 | 1/2020 | Attia et al. | |
| 2020/0069284 A1 | 3/2020 | Kobayashi et al. | |
| 2020/0077980 A1 | 3/2020 | Luo et al. | |
| 2020/0245968 A1 | 8/2020 | Nellur Prakash et al. | |
| 2020/0286405 A1 | 9/2020 | Buras et al. | |
| 2020/0297202 A1 | 9/2020 | Tashiro et al. | |
| 2021/0052249 A1 | 2/2021 | Gafner et al. | |
| 2021/0104313 A1* | 4/2021 | Mizobe | G06T 5/90 |
| 2021/0110135 A1 | 4/2021 | Zhou et al. | |
| 2021/0177452 A1 | 6/2021 | Nott et al. | |
| 2021/0315625 A1 | 10/2021 | Zarins et al. | |
| 2023/0414299 A1* | 12/2023 | Khuri-Yakub | B06B 1/0215 |
| 2024/0268784 A1* | 8/2024 | Prisant | A61B 8/4461 |

FOREIGN PATENT DOCUMENTS

| | | | |
|---|---|---|---|
| AU | 2018217335 B2 | 9/2018 | |
| CA | 3062396 A1 | 11/2018 | |
| CN | 201118572 Y | 9/2008 | |
| CN | 104363851 A | 2/2015 | |
| CN | 110279434 A | 9/2019 | |
| CN | 110392552 A | 10/2019 | |
| EP | 3143938 B1 | 4/2019 | |
| JP | 2014087700 A | 5/2014 | |
| WO | 2007/135450 A2 | 11/2007 | |
| WO | 2016/076669 A2 | 5/2016 | |
| WO | 2019/009919 A1 | 1/2019 | |
| WO | 2019/072827 A1 | 4/2019 | |
| WO | 2019/130767 A1 | 7/2019 | |
| WO | 2019/145147 A1 | 8/2019 | |
| WO | WO-2023026272 A1* | 3/2023 | A61B 8/12 |

* cited by examiner

ULTRASONIC ENDOCAVITARY IMAGING SYSTEM AND METHOD

CROSS-REFERENCE TO RELATED APPLICATIONS

This patent application claims priority from provisional U.S. Application No. 63/272,789, filed Oct. 28, 2021, the contents of which are incorporated by reference herein in their entirety.

TECHNICAL FIELD

The present invention relates to ultrasonic imaging systems, and more particularly to endocavitary imaging systems.

BACKGROUND ART

U.S. Pat. No. 8,679,014 discloses an ultrasonic endocavitary imaging system wherein an ultrasonic endocavitary is coupled via Bluetooth to a computing device such as mobile telephone that, in turn, is coupled over the internet to a server, where image data are processed and made available over the internet to a user. The image data can then be evaluated by a health care provider. Similar disclosure is provided in U.S. Pat. No. 8,679,013. A freehand scanning ultrasonic endocavitary probe is disclosed in U.S. patent publication 2018/0344291 A1.

SUMMARY OF THE EMBODIMENTS

In accordance with one embodiment of the invention, an ultrasonic endocavitary imaging system for developing an image of a portion of a body cavity includes an elongate probe having a longitudinal axis, a distal end configured for insertion into the body cavity, a proximal end opposite to the distal end. The system also includes a shaft rotatably mounted in the probe, in a manner supporting rotation about the longitudinal axis, and having a proximal end protruding from the proximal end of the probe and a distal end opposite to the proximal end. The system further includes handle pivotally attached to the proximal end of the shaft and configured to rotate the shaft within the probe and an image capture assembly. The image capture assembly includes a piezo crystal array, the array coupled to the distal end of the shaft and having an axis aligned with the longitudinal axis, the array configured to cause capture of an ultrasound image of the interior of the body cavity lying in a plane through which the longitudinal axis passes, so that, when the shaft is rotated within the probe by means of the handle, the plane is correspondingly rotated about the longitudinal axis, causing generation of swept image data in the interior of the body cavity. The image capture assembly further includes a radio frequency transceiver disposed in the probe and coupled to the piezo crystal array, the transceiver configured for transmitting the image data from the piezo crystal array to a computing device of a user.

Alternatively, or in addition, the imaging system further includes a switch, disposed in the handle, configured to cause operation of the image capture assembly.

Also, alternatively or in addition, the imaging system further includes an indicator, disposed in the handle, configured to signal a state of the image capture assembly. The indicator may be a light. The indicator also may be a vibratory transducer.

Further alternatively or in addition, the imaging system includes a first digital storage medium, encoded with first instructions that are configured to appear as an application on the user's computing device, and, when executed by a processor in the computing device, cause the computing device to receive the image data from the image capture assembly and to transmit first data, derived from the image data, over a wide area network to a server system. The imaging system also includes a second digital storage medium, encoded with second instructions that are configured to execute on the server system, so as to cause the server system to perform computer processes including (i) receiving the first data, (ii) using machine learning to develop enhanced image data from the first data, and (iii) making the enhanced image data available to the user.

Alternatively, or in addition, making the enhanced image data available to the user includes transmitting the enhanced image data to the user's computing device.

Also, alternatively or in addition, making the enhanced image data available to the user includes causing the enhanced image data to be downloadable from a web site.

Further alternatively or in addition, the imaging system includes a shaft encoder, coupled to the shaft and to the image capture assembly, wherein the image capture assembly is configured to correlate the image data with shaft position, so that downstream processing of the image data by the server system can reflect orientation information provided by the shaft encoder.

Alternatively, or in addition, the second instructions are additionally configured to cause the server system to perform computer processes including using machine learning to identify the presence of a feature in the enhanced image data. Also, alternatively or in addition, the feature is an egg follicle.

Also, alternatively or in addition, the imaging system further includes an electronic temperature sensor, mounted proximate to the distal end of the probe and coupled to the radio frequency transceiver, to cause the temperature of the body cavity to be transmitted to the computing device of the user.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "computer process" is the performance of a described function in a computer system using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "computing device" is an internet-coupled computer selected from the group consisting of a desktop computer, a smartphone, a tablet computer, a laptop computer, and a workstation.

Figure 1:
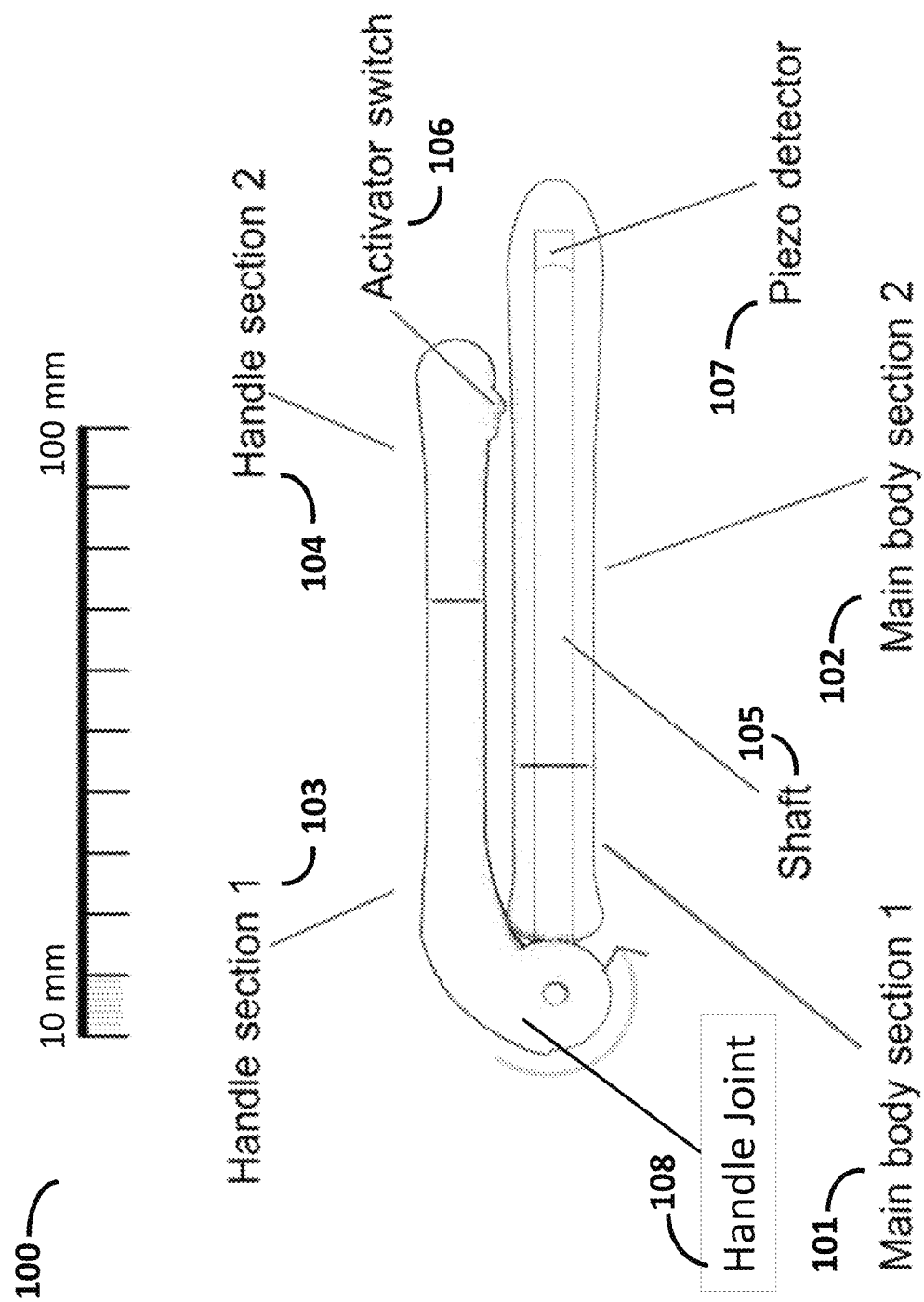
FIG. 1 is a side elevation of an embodiment of an ultrasonic endocavitary probe in accordance with an embodiment of the present invention.
Figure 2:
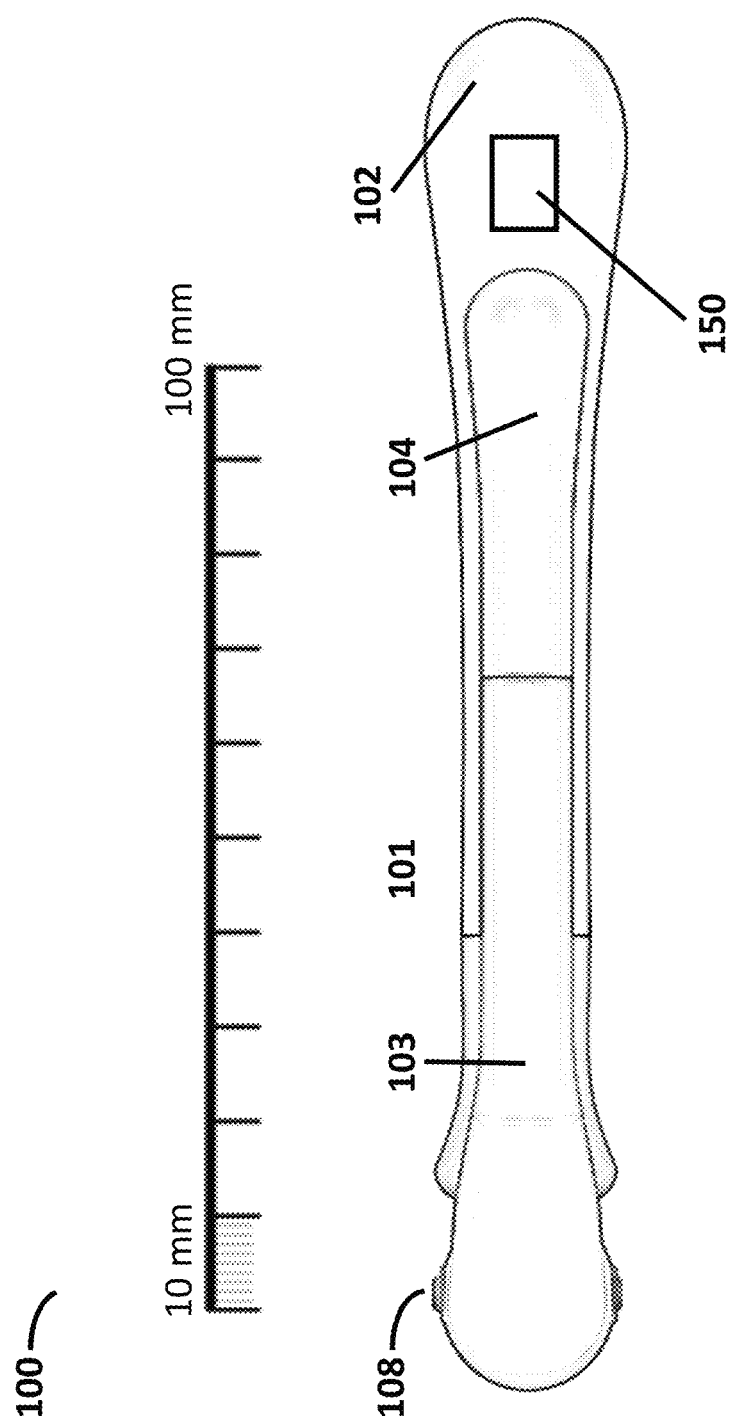
FIG. 2 is an overhead view of the endocavitary probe of FIG. 1.

FIG. 1 is a side elevation of an embodiment of an ultrasonic endocavitary probe in accordance with an embodiment of the present invention. FIG. 2 is an overhead view of the endocavitary probe of FIG. 1. A remote easy to use, single purpose, self-hand-operated elongate endocavitary transvaginal ultrasound probe 100. The elongate probe 100 has a longitudinal axis 115 (shown in FIG. 3), a distal end configured for insertion into the body cavity, and a proximal end opposite to the distal end. The distal end is at the tip 111 of main body section 2 102. A shaft 105 is rotatably mounted in the probe 100, in a manner supporting rotation about the longitudinal axis. The shaft 105 has a proximal end protruding from the proximal end of the probe and a distal end opposite to the proximal end. A handle 103-104 is pivotally attached to the proximal end of the shaft 105 and configured to rotate the shaft 105 within the probe 100. The probe 100 also includes an image capture assembly which includes a piezo crystal array 107 and a battery-powered radio frequency transceiver. The piezo crystal array 107 is coupled to the distal end of the shaft 105 and has an axis aligned with the longitudinal axis 115. The array is configured to cause capture of an ultrasound image of the interior of the body cavity lying in a plane through which the longitudinal axis 115 passes, so that, when the shaft 105 is rotated within the probe 100 by means of the handle 103-104, the plane is correspondingly rotated about the longitudinal axis 115, causing generation of swept image data in the interior of the body cavity. The radio frequency transceiver is disposed in the probe 100 and coupled to the piezo crystal array 107. The transceiver is configured for transmitting the image data from the piezo crystal array 107 to a computing device of a user.

The ultrasound transducer includes one or more piezoelectric elements 107 suitably aligned and capable of generating stable images in 2D, 3D or 4D format. Illustratively, the ultrasound transducer may include 1-10 piezoelectric elements 107. Further, these piezoelectric elements 107 capture real time raw (uncalibrated) ultrasound images.

In some embodiments, the ultrasonic endocavitary probe includes an electronic temperature sensor 150, disposed in the main body section 2 of the probe, and configured to measure an in vivo temperature of a body cavity surrounding the probe. The temperature sensor 150 is coupled to the radio transceiver to cause the temperature of the body cavity to be transmitted to the computing device of the user.

Figure 3:
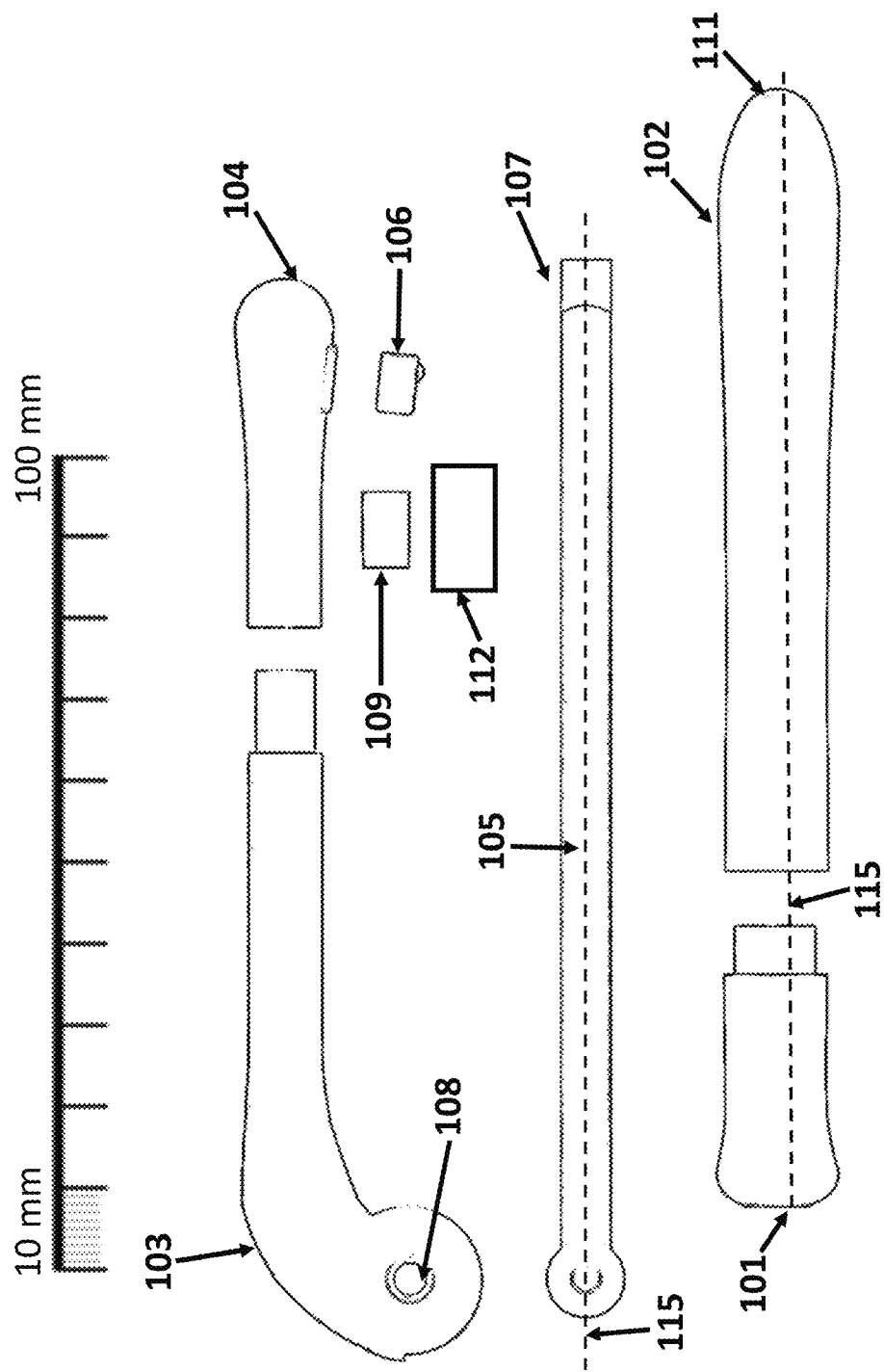
FIG. 3 is an exploded view of the endocavitary probe of FIG. 1.

FIG. 3 is an exploded view of the endocavitary probe of FIG. 1. The main body 101-102 of the probe may optionally be constructed in a plurality of parts and has an acoustic insulator and plastic covering, as required by regulation. The plastic covering is designed for ease of cleaning and has an appropriate shape for an external sleeve. A circuit board 112 includes the radio frequency transceiver, such as for Bluetooth, and is disposed in the main body. A battery 109 may be placed either in the handle section 103 to 104 or in the main body 102.

Further, the handle 103-104 may include an on/off switch 106. In addition to the switch 106, the probe may also include an indicator (not shown). The indicator may, for example, be a light source such as an LED disposed in the handle and configured to be illuminated to indicate the probe is 'on' and/or charged. For those not able to see this, the indicator may be provided in a form of a sound effect or vibration by a vibratory transducer that can be located in the probe or in the handle.

Figure 4:
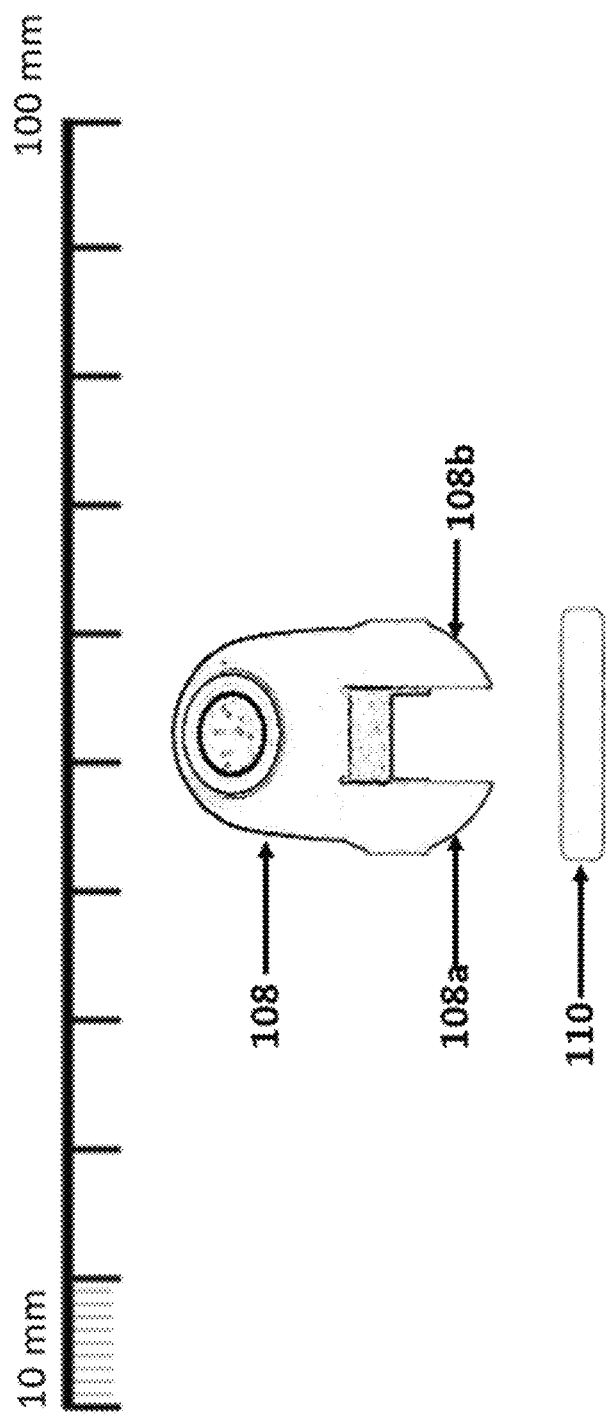
FIG. 4 shows components associated with the pivot arrangement of the probe of FIG. 1.

FIG. 4 shows components associated with the pivot arrangement of the probe of FIG. 1. The handle joint 108 links the main section 101 to the handle. Handle joint 108 supports a pivot 110 between wings 108a and 108b. The pivot 110 pivotally mounts shaft 105. The outside of the probe is configured so that at least main body section 2 102 can remain stationary in a body cavity while the handle causes the shaft to rotate within it. Here, there may be wiring/electric connection through the joint/shaft to the piezo-electrics as used in computing and mobile phones or other situations that use connections across folding joints.

Figure 5:
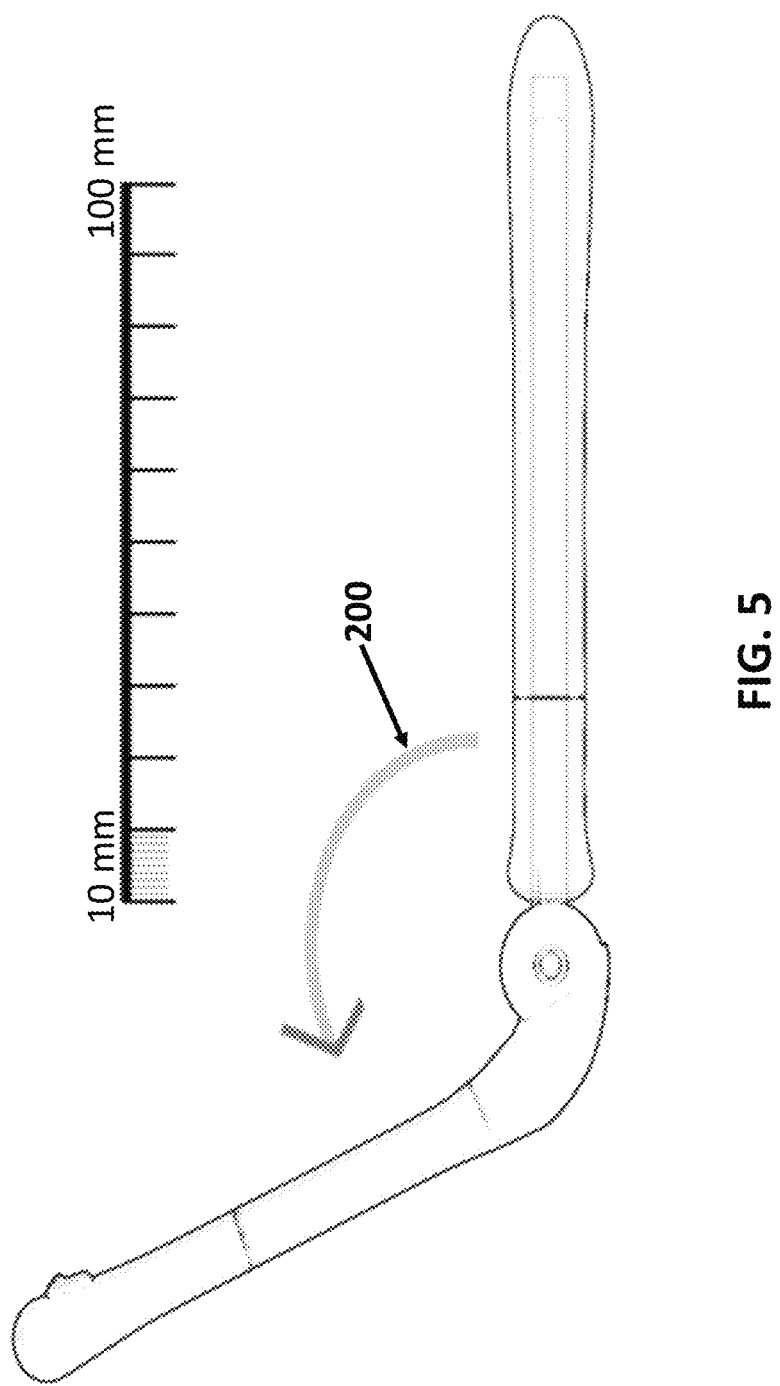
FIG. 5 is a side elevation of the endocavitary probe of FIG. 1 with the handle opened to a deployment position for use.

FIG. 5 is a side elevation of the endocavitary probe of FIG. 1 with the handle opened to a deployment position for use. FIG. 5 by way of example illustrates how the handle on the endocavitary probe opens 200 and folds back over the main body. This folding mechanism provides a compact device making it discreet and easy to transport. The addition of a handle on the endocavitary probe enables the individual to use the device with ease either on their own or with the help of their partner. This design is flexible and varies in shape depending on type of self-use.

Figure 6:
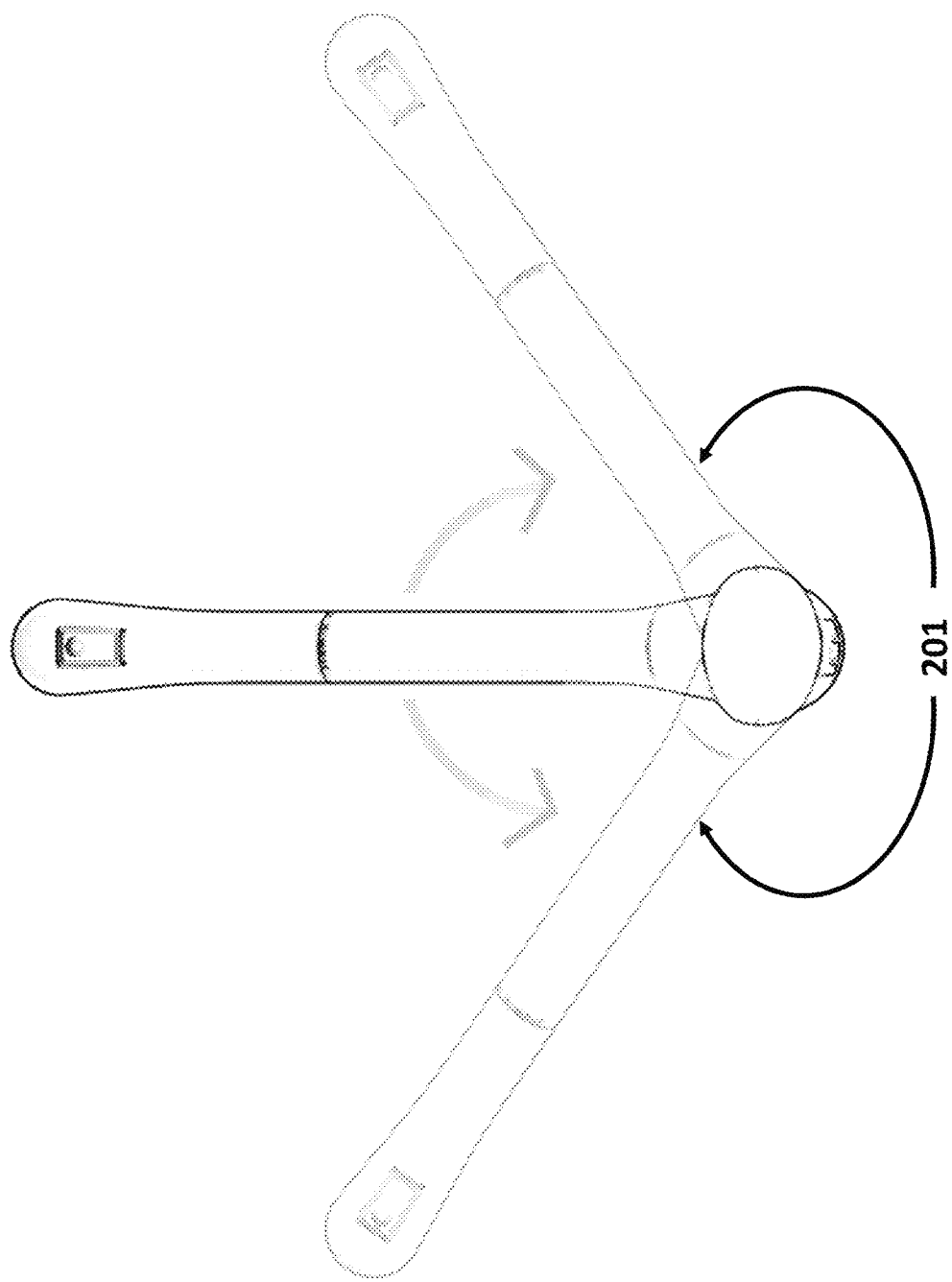
FIG. 6 is a view of the endocavitary probe of FIG. 1 showing use of the handle to achieve rotation of the probe body to achieve scanning for creating an image within a cavity.

FIG. 6 is a view of the endocavitary probe of FIG. 1 showing use of the handle to achieve rotation of the probe body to achieve scanning for creating an image within a cavity. FIG. 6 demonstrates how the handle can be oriented manually by rotation 201 about the pivot to facilitate focusing and scanning an area. It is characterized by a mechanical rotation sweep of any or between 0-180 degrees but ideally 90 degrees in a period of time between <1-5 seconds but ideally 3 seconds, controlled by a control lever arm 104 or other means of generating a manual hand-operated rotation including but not exclusively a knurled, lobed, winged, ball, or single or multiple arm knob or tensioned button.

In one embodiment a 3D volume can be scanned by the array via rotation of the handle about the longitudinal axis 115. This scanning arrangement is similar to the Stradwin process (Treece, G. M., Prager, R. W., Gee, A. H.: The Stradwin 3D Ultrasound Acquisition and Visualisation System, http://mi.eng.cam.ac.uk/~rwp/stradwin/), which reports manual manipulation by a medical practitioner of a normal commercial ultrasound probe to build a scanned 3D volume In embodiments of the present invention, the image data is improved by exploiting the phase information in the IQ or RF data and by supplying associated pose information, either through an accelerometer's measurements of the gradational vector or a shaft encoder by which to correlate shaft and array position with image data. See, for example, https://www.electro-sensors.com/products/shaft-speed-pulse-generators/encoders.

It is further expressly contemplated that the endocavitary probe 100 may be utilized in one embodiment as a data (image) acquisition tool and not a diagnostic device. The probe therefore may be used only for obtaining pre-processed or processed ultrasound images.

The endocavitary probe 100 is designed specifically for personal/self-use in non-clinical settings and for those in clinic settings not trained and/or trained in the art of sonography, or other imaging apparatus and its interpretation and analysis.

The endocavitary ultrasound probe 100 may be used in a non-clinical setting, typically a person home or other private non-clinical setting or remote places and without resource to clinicians to understand and interpret the output.

The endocavitary ultrasound probe 100 may make use of Artificial Intelligence (AI) such as an enterprise Machine Learning Server (MLS). Sophisticated algorithms for analysis combined with the endocavitary probe in non-clinical setting may form part of an automated home monitoring process.

The combination of the endocavitary ultrasound probe and MLS but not exclusively can use a pre-trained MLS platform, and algorithms may form part of an automated monitoring in a clinical setting for use by both those trained in imagery interpretation and for the untrained healthcare clinicians.

A standalone software model of training MLS platforms using historical data can be used with other imaging apparatus to automate processes in other imaging apparatus and enable those not skilled in the art of interpreting or analyzing specialized imaging apparatus to use in a clinical or non-clinical setting.

Figure 7:
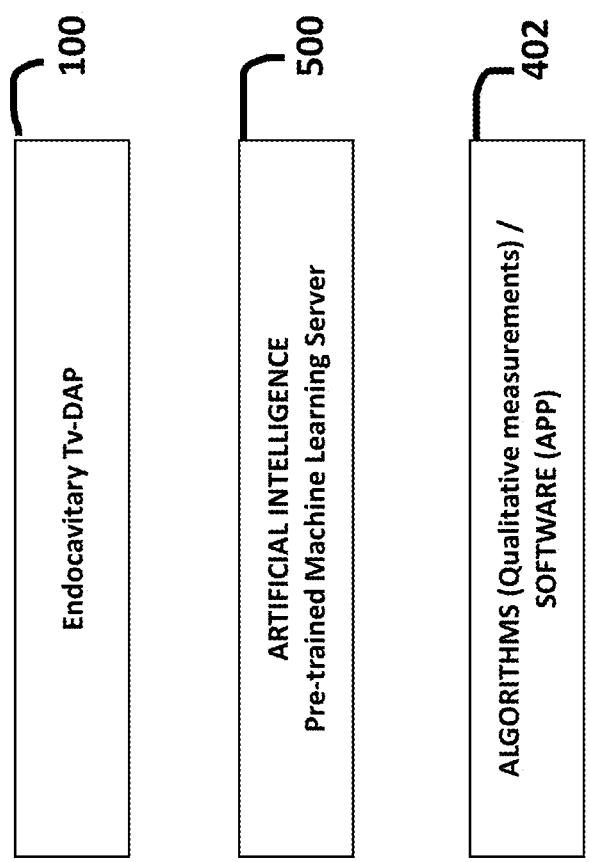
FIG. 7 is a block diagram of an embodiment of the present invention in a method utilizing the probe of FIG. 1 in a transvaginal context to detect ovulation.

FIG. 7 is a block diagram of an embodiment of the present invention in a method utilizing the probe of FIG. 1 in a transvaginal context to detect ovulation.

An endocavitary ultrasound probe such as the endocavitary probe 100 delivers the in-vitro fertilization (IVF) clinical capability of a trans-vaginal ultrasound probe to the home, for use by couples with no clinical training to provide real-time clinical quality images and results of ovulation on a mobile device. The probe 100 is designed specifically for remote self-use.

The endocavitary probe 100 may be provided as part of a commercial advance ovulation detecting/monitoring kit for all women wanting to conceive, whether they have a problem with conception or not. Combing the remote self-use endocavitary probe 100 with the pre-trained MLS platform 500 and development of intelligent algorithms 402 to quantify features within a sonogram obtained from the endocavitary probe will enable anyone without prior knowledge in the art of interpreting and analyzing ultrasound images to use the kit anywhere with internet connection, using a mobile device to determine their fertility status.

Home ovulation kits are becoming more sophisticated as the infertility market continues to grow and all currently use singly or in combination, the 3 main biological parameters: Hormonal surges, electrolytes and basal temperatures with a trend towards modern looking gadgets to add novelty and value.

Although Ovulation kits and mobile Apps have helped many couples to conceive it is well reported the range of problems that users tend to find:
  Disengaging—Partner/husband do not feel a part of this process or involved at this stage
  Inconvenient—Particularly for wearable gadgets for monitoring ovulation
  Unconvincing—Users not convinced they have definitely ovulated
  Limited—Only provides indirect measurements.
  Irregular cycles—Difficult to time and detect.

Taking a trans-vaginal ultrasound probe into the home for self-use as an advance ovulating detecting kit benefits all those wanting to conceive whether they have a problem or not in particular those trying to conceive naturally (TtC)™ and who would normally buy an over the counter ovulation detecting kit. Not only is it available to those trying to conceive naturally, but can in another embodiment be used to fully automate part of the IVF process—Measure follicle and the Endometrium; where couples are normally required to attend the clinics within the first few weeks to monitor fertility status. In addition, it can be used as part of the Egg Freezing monitoring program that is gaining popularity for career minded women that want to delay having a family or for health reasons.

The benefits the endocavitary probe 100 provides as an Advance Ovulating Detecting kit may include but not exclusively:
  Integrates seamlessly into the existing IVF process—
  Enable clients to use an ergonomically designed ultrasound probe for self-use, without clinician input; providing results directly to both clients and or clinicians.
  Sophisticated Bespoke ovulating detecting kit that can be used in the home or anywhere with internet.
  Particularly useful for women that have irregular cycles
  Automates part of the IVF process—provides the exact same clinical measurements undertaken Reduce client and clinic contact time (Covid-19)—improve the number of treatments Provides an additional service/product offering Couples are fully engaged in the process and will feel more empowered.

Reduced inconvenience, travelling and clinic time and costs

Provides 'real-time' direct measure of ovulation

Positive psychological impact—seeing is believing and provides reassurance.

Measures more than just ovulation—can determine if the uterine lining is receptive for implantation of the ovum.

Clinicians can access to the back-end of the programme to identify potential problems sooner rather than later.

Couples will get seen by specialist sooner rather than waiting for up to 2 or more years if something untoward is identified.

Currently there are no other ovulation detecting kits that can automate part of the IVF process and show an image of the status of ovulation and provide further information other than just a 'window of opportunity' to optimize conception.

The endocavitary probe 100 will now be referred to as Trans-vaginal Data Acquisition Probe (Tv-DAP) for this specific use and in this example, but not exclusively incorporates three integrated elements:

A unique ergonomically designed trans-vaginal data acquisition probe (Tv-DAP)™ 100

Artificial Intelligence (AI)—the Machine Learning Server (MLS) 500 and algorithms for qualitative and quantitative analysis Software (App)/Website 402—Communication In some embodiments, a personal remote 'self-operated' imaging apparatus is provided, in this example an endocavitary Trans-Vaginal Data Acquisition probe (Tv-DAP) that acquires raw ultrasound images from the pelvic area of a women to be sent via a computing device to the cloud and processed in the cloud using the pre-trained Machine Learning Server (MLS) and the bespoke algorithms before returning results to the untrained user to act upon using an App. In some embodiments, the ultrasonic endocavitary probe includes an electronic temperature sensor configured to measure an in vivo temperature of a body cavity surrounding the probe. The measured temperature is sent via a computing device to the MLS to provide further feedback on the App for the user.

This method will not only enable the ultrasound endocavitary probe to be designed for personal use in the home, but will guide and train normal people not skilled in the art of sonography on how to use the ultrasound endocavitary probe. In this example, all they have to do is follow instructions provided by the App/Website and insert the endocavitary probe into the vagina themselves or with the help of their partner whilst the pre-trained MLS performs the pre-processing, interpretation, analysis, and immediately provides results back to the App/website on a computing device for the user and/or clinician to act upon accordingly. The user can see on their computing device if they have ovulated and can be informed on stage of menstrual cycle and actions necessary to optimize conception or treatment.

Further as way of example but not exclusive, the model can be used to automate part of the fertility healthcare and egg freezing clinics which empowers and engages couples for they can feel in control using the 'self-use' endocavitary in the comfort of their own home.

Designing imaging apparatus for self-use, that can be used anywhere, and development and training software for specific self-use that is automatically able to train and guide non-qualified users on how to use the imaging apparatus will provide use in many other markets, including healthcare providers such as hospitals, surgeries, veterinaries, and for non-clinical settings using their specific ultrasound imaging equipment. The bespoke software model enables staff not trained in the art of sonography or other imaging apparatus to use the specialized imaging equipment, and for those that are trained the automated process helps improve efficiency and accuracy for it enables the user to receive the equivalent of hundreds or thousands of doctors' opinions, not just one person. This model works for all types of ultrasound probes and can be used with other clinical or non-clinical imaging apparatus, enabling other imaging apparatus to the home for personal use.

Figure 8:
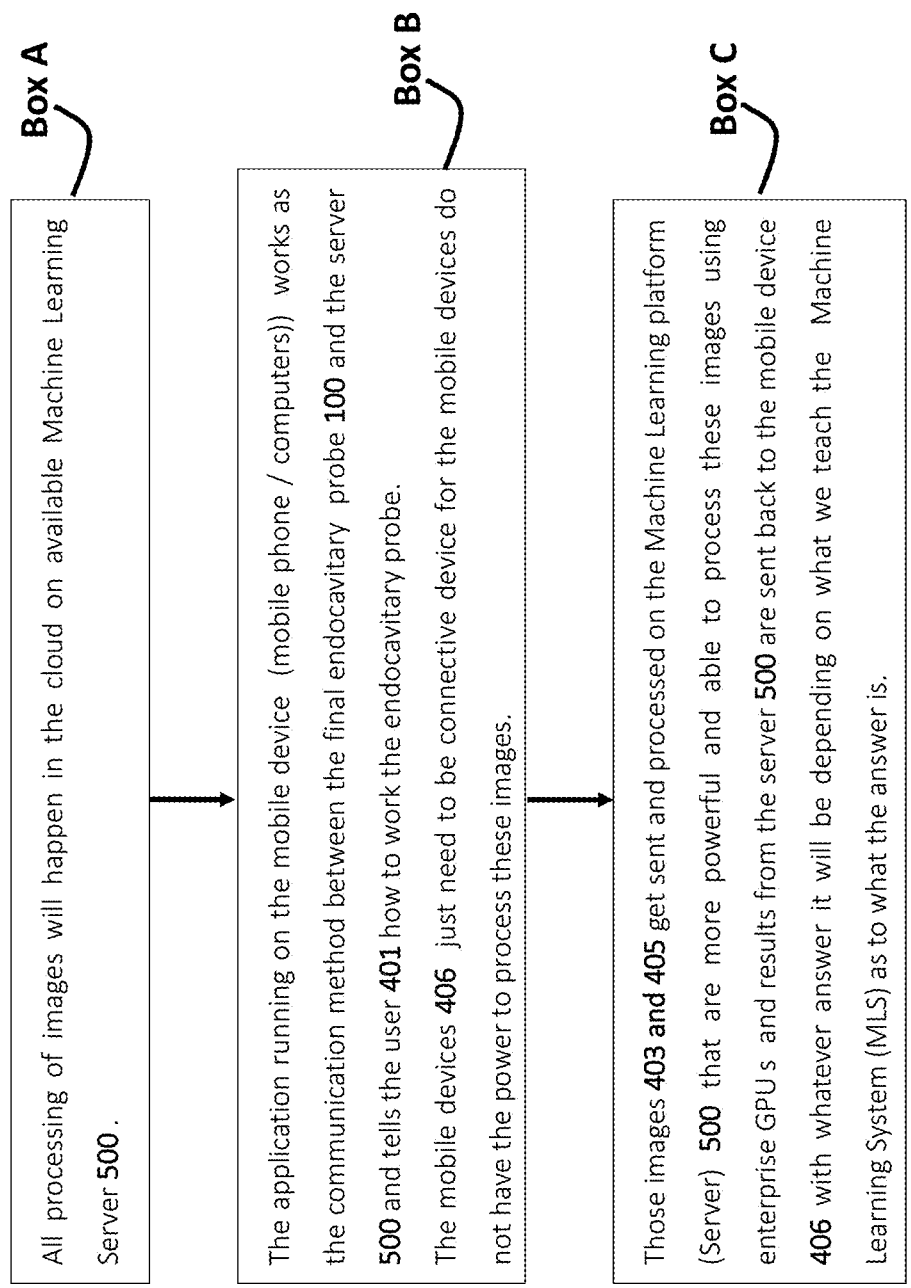
FIG. 8 is a block diagram illustrating processes in a further related embodiment of a method according to the present invention.

FIG. 8 is a block diagram illustrating processes in a further related embodiment of a method according to the present invention. FIG. 8 outlines the relevance of the endocavitary Tv-DAP, computing device and the server for automating the ultrasound image processes and analysis of ultrasound images.

Box A—All pre-processing and processing of images and analysis is performed in the cloud on the available Machine Learning Server 500. Best imaging results are provided in the cloud.

Box B—The application running on the computing device works as the communication method between the endocavitary probe 100 and the server 500 and tells the user 401 how to work the endocavitary probe. The computing devices 406 just are connective devices for some computing devices, such as mobile phones, do not have the power to process ultrasound images.

Box C—Images 403 and 405 are sent to and processed on the Machine Learning platform (Server) 500. The MLS 500 is more powerful and able to process these images using enterprise GPUs. Results from the server 500 are sent back to the computing device 406. The type of results sent back depends on the configuration and training of the Machine Learning System MLS.

Figure 9:
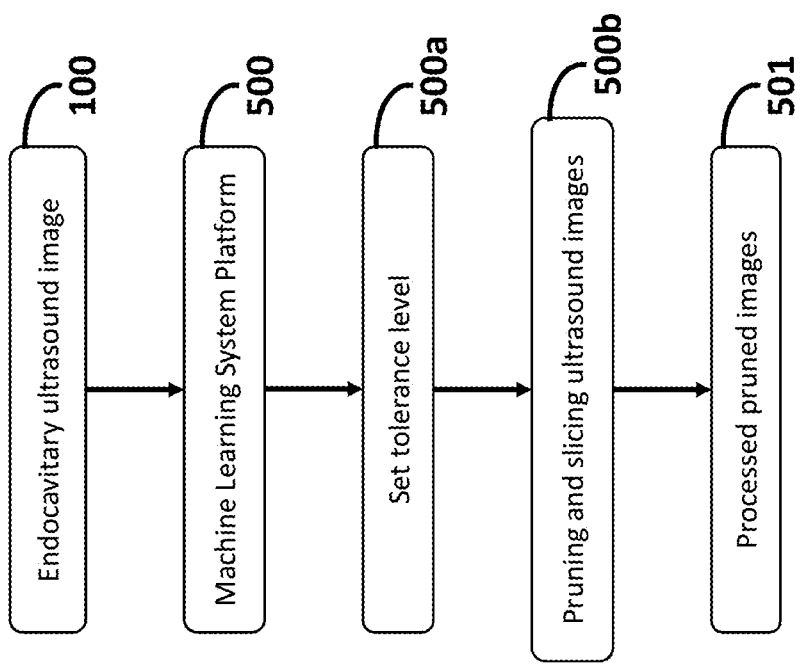
FIG. 9 is a logical flow diagram of an embodiment of a method according to the present invention employing machine learning to recognize features in an ultrasonic image obtained using a probe such as that of FIG. 1.
Figure 10:
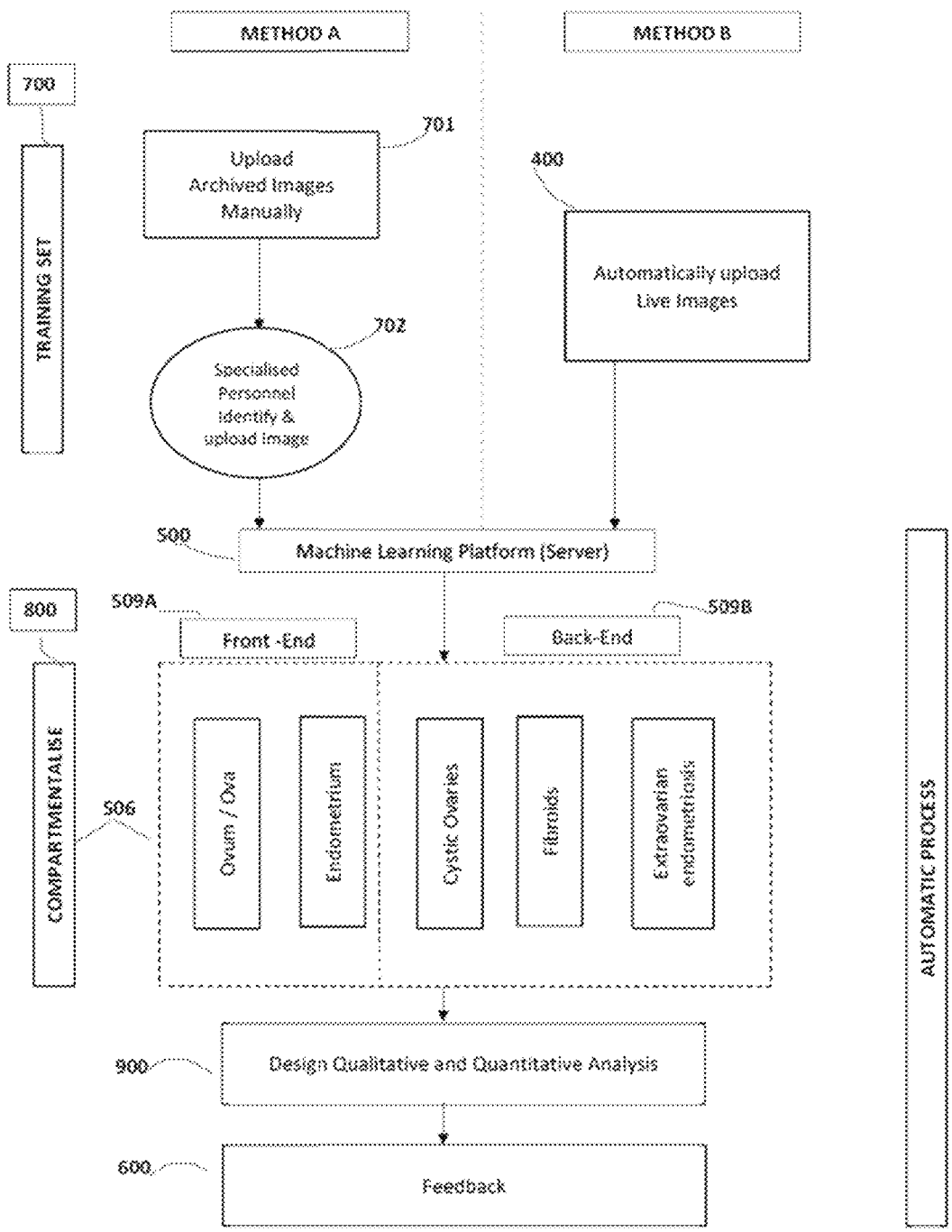
FIG. 10 is a logical flow diagram of embodiments of the present invention for training an enterprise machine learning.

FIG. 9 is a logical flow diagram of an embodiment of a method according to the present invention employing machine learning to recognize features in an ultrasonic image obtained using a probe such as that of FIG. 1. FIG. 10 is a logical flow diagram of embodiments of the present invention for training an enterprise machine learning server such as the MLS.

The initial training of the MLS encompasses uploading image files, seeing the images on the screen, marking the required features, compartmentalizing, and taking measurements. This requires a lot of nodes to run on the server for the server has to process a lot of images.

Further, the MLS works on enterprise GPU nodes, which provide any required number of nodes and can process the images in milliseconds, providing upload and download of results. The cost of processing is calculated per hour of GPU node, but no payment is necessary when the nodes are not in use. However, there is a spooling time.

The MLS will take a large number of images obtained either through archived data or live upload. The more images are provided to the MLS the more accuracy in the data can be achieved, so in effect the MLS reflects the expertise of many medical professionals. The MLS can then recognize what it has been taught and can process and analyze the data automatically that is transmitted from the endocavitary probe to the MLS in real time.

Illustratively, remotely captured uncalibrated (raw) ultrasound images are sent from the endocavitary probe via the computing device to the MLS to be pre-processed (pruned)

in preparation for analysis and interpretation. To do this the MLS server needs to be taught how to:

(A) Train the MLS to pre-prune/slice the raw uncalibrated ultrasound images. When the desired area is scanned by the endocavitary probe (Tv-DAP) 100, the probe provides a substantial number of uncalibrated ultrasound images to the MLS platform 500 and this will need to be reduced by pre-pruning/slicing 500b the raw images before being further processed by the MLS. However, using the MLS the ultrasound images may or may not require pre-processing for the MLS will be trained to know if the slice image is good enough using similarity tolerance 500a. For example, if the tolerance is less than 90% it will move to the $2^{nd}$ level processing. Different levels can be set-up for acceptability, and only those images at acceptable threshold will go on to be processed for interpretation and analysis 501.

(B) Train the MLS to recognise morphology features within the imaging apparatus. To enable automation of ultrasound imaging but not exclusively, the MLS has to be taught to identify a particular feature or object in an image. Training of the MLS is performed by y specialized personnel, i.e., those skilled in the art of interpreting ultrasound images, For example a gynecologist or fertility specialist who is familiar at looking in the pelvic region of a female takes the archived images, and manually upload the images to the MLS, and trains the MLS as to what features it should be detecting. This involves teaching the MLS to recognize specific features in an ultrasound image so that when a person performs a life scan the MLS will be able to extract, segment, and identify features by relying on the training data that has been uploaded by the specialized personnel and further compartmentalized and analyzed. To this end, the MLS may include a neural network.

Training the Machine Learning System to classify by morphology recognition of particular features within an ultrasound image will require the use of:

Archived historical calibrated ultrasound images—Method A (700)

Live ultrasound images that have not been calibrated—Method B (700)

In this context but not exclusively 3D ultrasound images will be used.

Method A (700)—requires those skilled in the art of interpreting ultrasound images 702 to pre-screen the archived image and check that one or more identified features are correct before manually uploading the archived images 701 and identified features onto the MLS 500. The feature or features can then be appropriately labeled and compartmentalized 800 on the enterprise MLS platform 500. Here, the identified features are placed into their appropriate compartments; for example, if in the archived image an ovum or ova has been identified by a specialized sonographer or consultant 702, then this will automatically be placed into the appropriate labelled compartment 506 (Ovum/Ova). The ultrasound images vary and may have different background noise, different shapes, size ova and different shading. The more archived images and identified features are uploaded, the more the MLS learns to recognize one or more of these features in an ultrasound image, whether it is an ova or ovum, or mixed with other feature(s).

For use as an advance ovulating detecting/monitoring kit, images of both the ovum and endometrium will be placed in a named compartment after segmentation, and this will be available for access at the front end of the program 509A and immediately available to the self-user and or clinician. All other features will be in the compartments at the back-end 509B of the program and available to but not exclusively to clinicians and healthcare providers.

The MLS platform can have as many compartments 506 as required to place identified features within the scanned region including but not exclusively examples in 506.

Method B (700)—Is an example of a related embodiment. The machine learning system is continually able to learn using the live images 400 obtained from the endocavitary probe. Pre-processed and/or processed ultrasound images are transmitted from the endocavitary probe to the MLS platform to be pre-pruned (sliced) and processed as described above in Method A.

Processing of the image data is performed in a data center which could be for example in the United States or Europe. It does not store data. Data obtained from the MLS is stored using a server in a data center that could be anywhere in the world.

The endocavitary ultrasound probe 100 thus utilizes available machine learning capabilities based on an extensive archive of historical and live images to deliver analysis and interpretation of the image that can be understood by an untrained and non-clinical user.

Specialized algorithms work with the commercially available MLS to enable analysis of the processed data. This enables features that have been extracted, identified and compartmentalized 700 to 800 to be analyzed qualitatively and quantitatively 900. If used as an advance ovulating detecting kit, the MLS is taught how to:

Count how many ova are present

Measure the size of the ova, to determine the stage of the menstrual cycle

Measure the thickness of the endometrium.

Provide on the app a real time image of an Ovum/Ova if present—This will be in an appropriate format for both the self-user and the fertility and healthcare providers.

These are the same measurements that are usually performed by fertility healthcare and egg freezing clinics, and the advance ovulation detecting kit now enables these measurements to be taken at the home by those not trained in the art of interpreting and analyzing ultrasound images. All the analysis takes place automatically on the Machine Learning Platform 500 which is configured to provide relevant feedback 600 to the user and/or healthcare provider.

The ovulation detecting kit may also be made available over the counter for those trying to conceive naturally (TtC™). It provides the same clinical data as described above: Informing users immediately of their state of menstrual cycle and how to act upon the results; optimising their chance to conceive.

Any other features identified by the back-end 509B are also measured for size and counted in preparation for relevant feed-back 600 to the healthcare provider.

Figure 11:
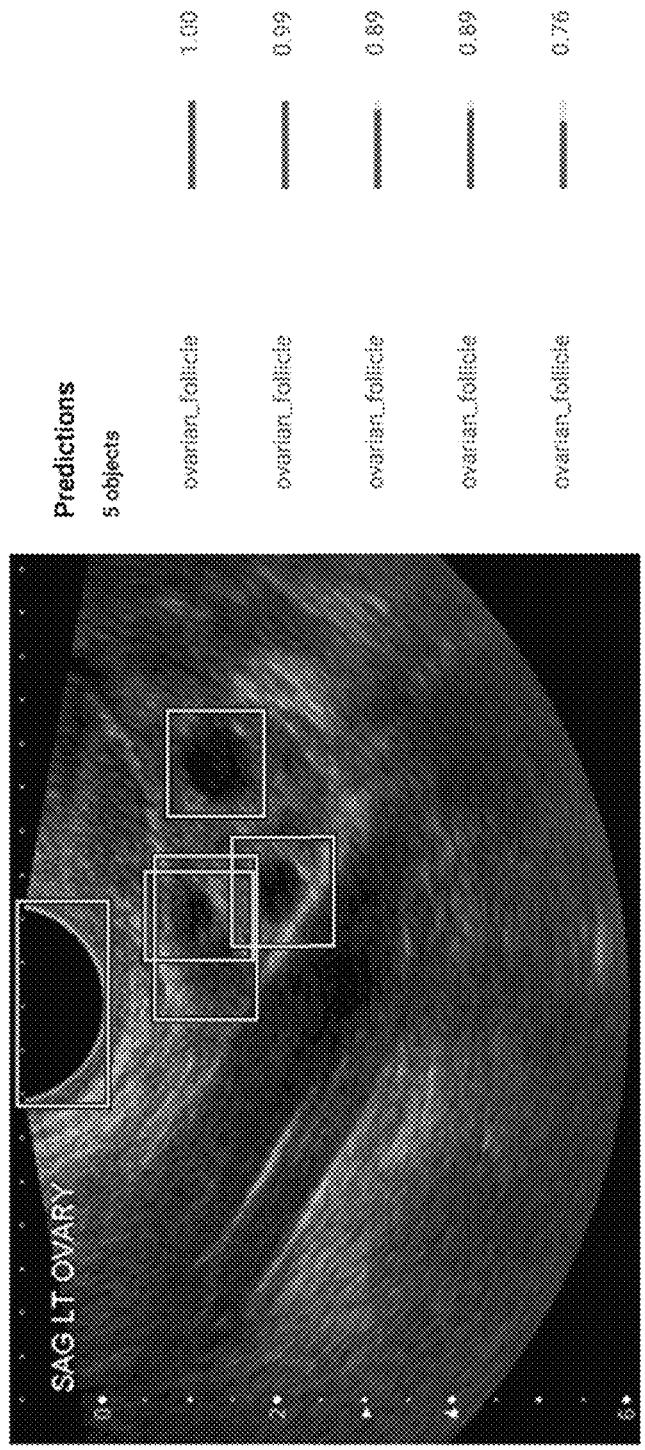
FIG. 11 is a photograph of a calibrated ultrasound image of a few ovarian follicles that have been identified and marked by a machine learning server in accordance with an embodiment of the present invention.
Figure 12:
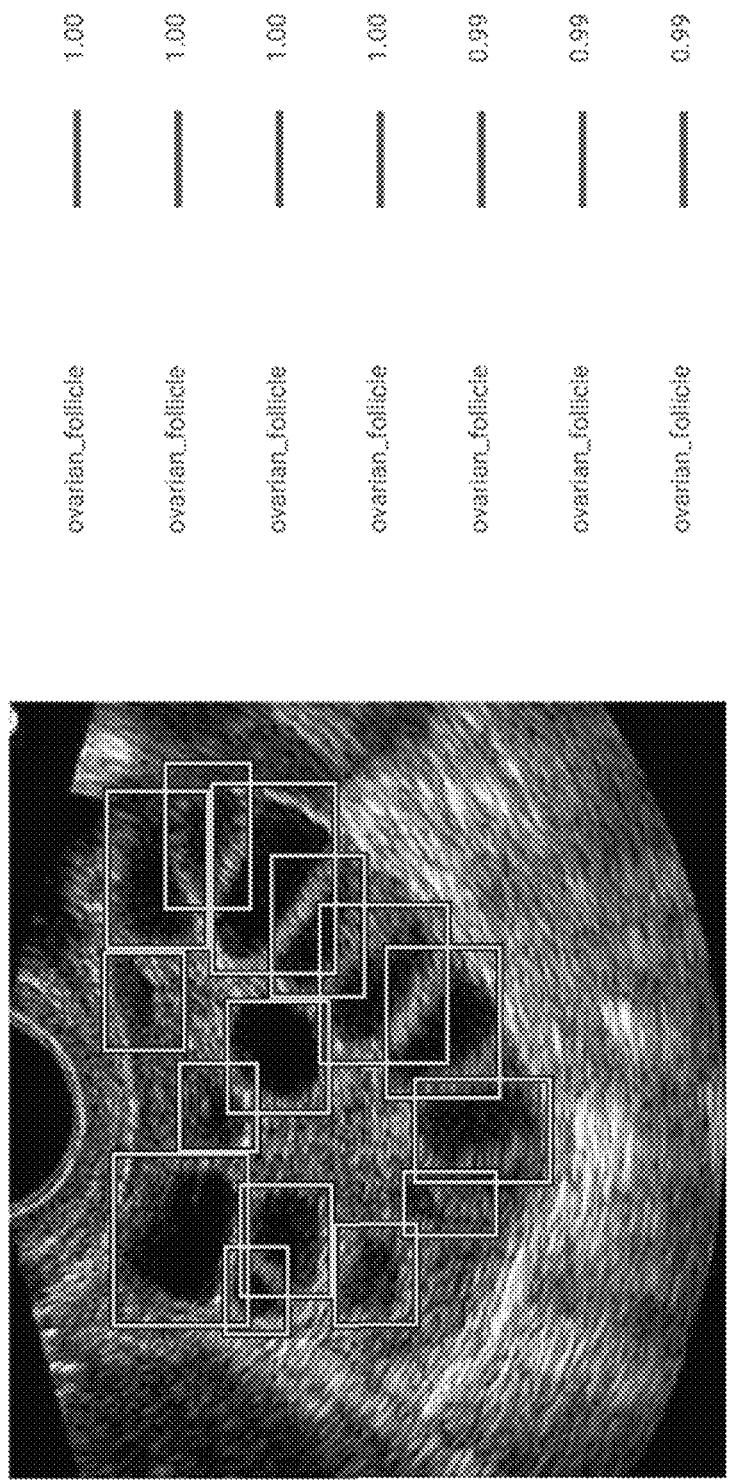
FIG. 12 is a photograph of a calibrated 2D ultrasound image of many ovarian follicles that have been identified and marked by a machine learning server in accordance with an embodiment of the present invention.

FIG. 11 is a photograph of a calibrated ultrasound image of a few ovarian follicles that have been identified and marked by a machine learning server in accordance with an embodiment of the present invention. FIG. 12 is a photograph of a calibrated 2D ultrasound image of many ovarian follicles that have been identified and marked by a machine learning server in accordance with an embodiment of the present invention. The MLS has been trained to recognize follicles in an ultrasound image (sonogram) that has been pre-processed (calibrated), for example as described above. In an example, using a small selection of 2D ultrasound images obtained from Google, the Machine Learning Server (MLS) was trained to recognize follicles in a calibrated ultrasound image otherwise known as sonogram. These follicles have been found in an ultrasound image and selected by the MLS without human intervention and only based on a few training images. The numbers on the right of the images are the "Accuracy" the MLS believes its selection has, based on the training data it was given. The MLS was able to high-light and extract features resembling follicles as shown in both FIGS. 11 and 12, and it was able to autonomously count and measure follicles with an accuracy rate of 87% with only a few images (<10) used as a training guide. The dark curve space (from the scanner) feature at the top of the sonogram was also identified in FIG. 11 as a follicle, but the MLS can be trained to exclude this with more learning images as shown in FIG. 12. Enhancement of the image may not be required, for the MLS is trained to recognize the features in the initial uncalibrated images, particularly as it performs the pre-processing; slicing and pruning steps on the images in preparation for interpretation and analysis. The model shown here enables reliable, real-time detection of the follicles and in addition provides measurements of the endometrium and other features identified in the pelvic area to optimize conception and inform the user at what stage of the menstrual cycle they are at as measured by the size of the follicles. In addition, or alternatively, the model can inform the user if they are ready for the next stage in the IVF process and/or egg freezing or notify the user if anything un-towards is identified. The data built can be validated against 'live' analysis provided by healthcare providers.

Figure 13:
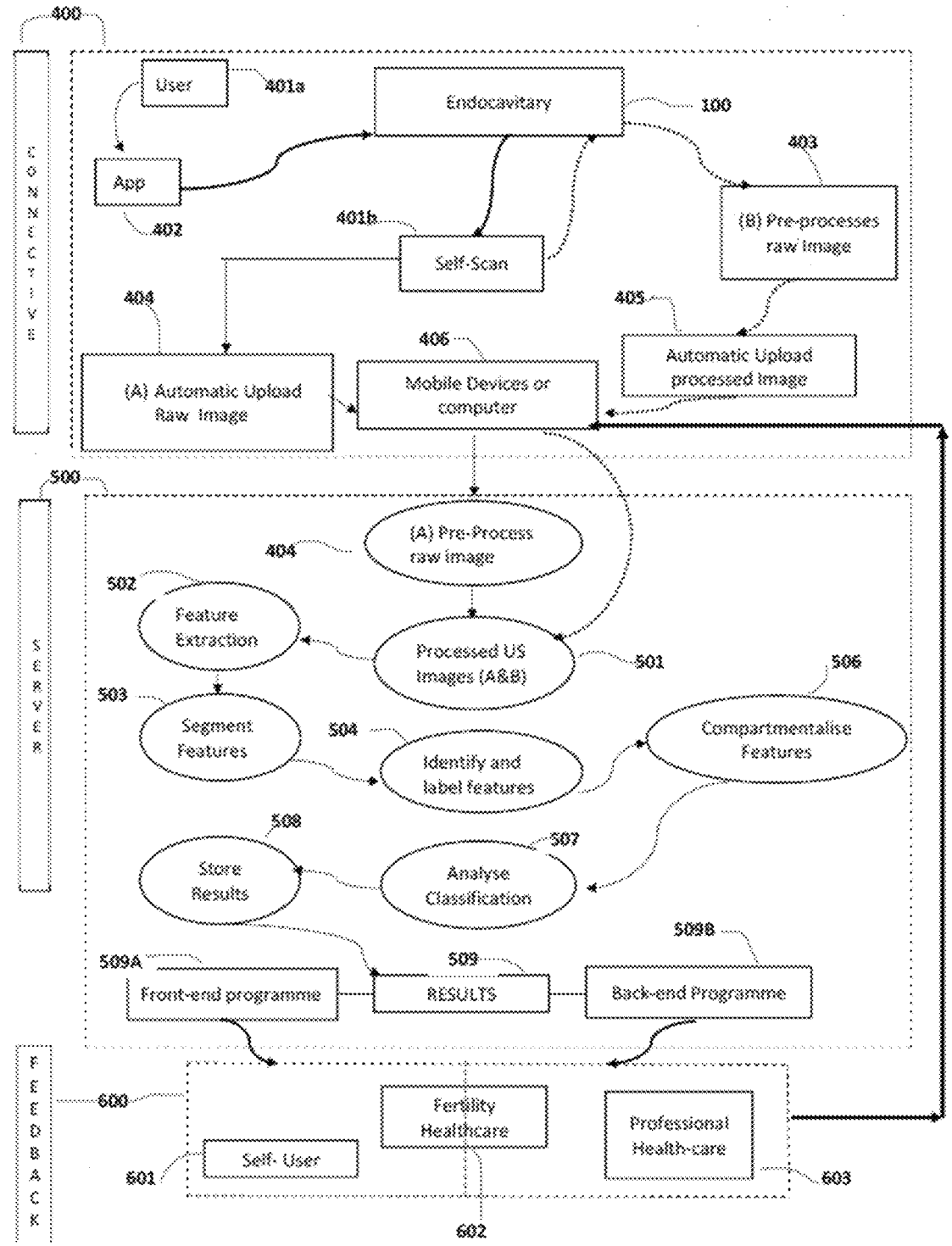
FIG. 13 is a block diagram of an end-to-end method showing processes for using a probe, such as the probe of FIG. 1, for obtaining endocavitary image data, processing such data to obtain image data, and providing results of these processes to the subject, in accordance with an embodiment of the present invention.
Figure 14:
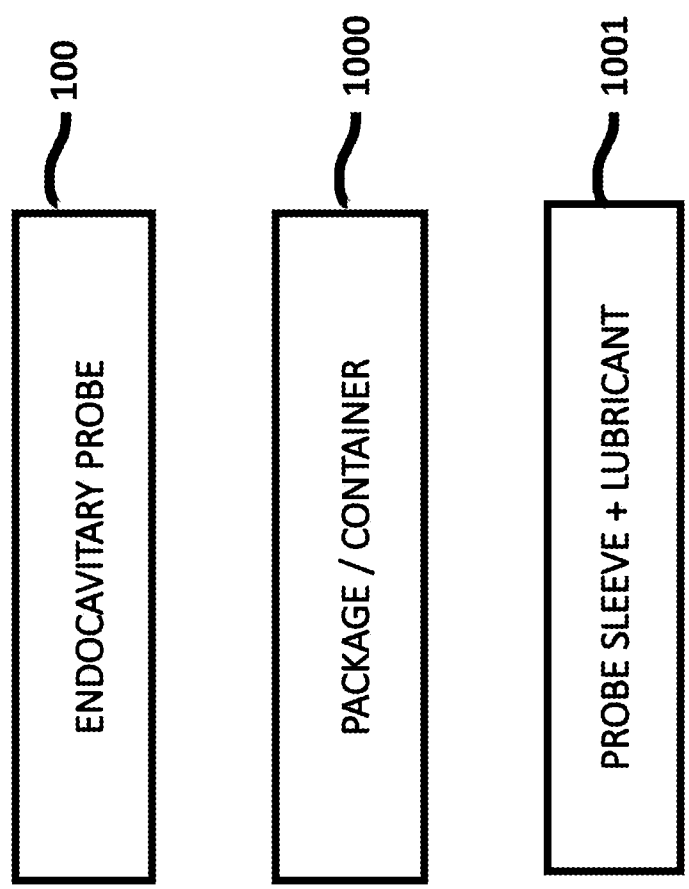
FIG. 14 is a block diagram illustrating components of an over-the-counter advance ovulation detection kit in accordance an embodiment of the present invention.

FIG. 13 is a block diagram of an end-to-end method showing processes for using a probe, such as the probe of FIG. 1, for obtaining endocavitary image data, processing such data to obtain image data, and providing results of these processes to the subject, in accordance with an embodiment of the present invention. The block diagram of FIG. 13 is separated into three blocks:

Block 400—Connectivity. This is the interface/communication between the user 401a and the endocavitary probe (Tv-DAP) 100 using a designed app and/or webpage 402 that can be downloaded on a computing device 406 or any device with internet connection. Once uploaded, the remote self-operated endocavitary Tv-DAP, when turned on with the "on/off" switch, automatically connects with the computing device 406. The app 402 provides an introduction to the hardware kit, as shown in FIG. 14, and provide instructions, by audio, video, and/or written. The app may explain to the user 401a how to prepare the endocavitary (Tv-DAP) for use, for example how to put the sleeve on the probe and apply the gel. It may also explain and/or demonstrate how to get in a comfortable appropriate position before inserting the Tv-DAP into the vagina to achieve an optimal ultrasound image. This may involve informing the user how far to insert the probe, and how to scan the area of interest using the handle on the endocavitary probe, and when to stop. The app may also ask what features are of interest to the user and provide a selection e.g. follicles, endometrium and other identified features. When the ultrasound scan is completed by the user 401b, any raw ultrasound images will either but not exclusively be sent to the server 501, via the computing device 406, to be pre-processed (pruned) 404. If the image is being pre-processed 403 by the Tv-DAP 100 then the pre-processed images automatically upload 405 to the mobile device 406, before being sent to the server 501.

Block 500—The pre-trained MLS analyzes the processed images 501 and extracts features 502 within the image that it recognizes from its training. The MLS also segments the different morphologies 503 by putting an outline on each individual feature, as shown in FIGS. 11 and 12, and labelling the identified features 504 before compartmentalizing the different features 506. The analysis 507 may but not exclusively take place once compartmentalized 506. The qualitative and quantitative analysis will be stored on a data system in the cloud 508, and the results 509 will be either stored in the frontend program 509A or the back-end program 509B, depending on whether the results are being transmitted to the user or to a healthcare provider. The self-user and/or healthcare provider has access at any time to the stored information, and not exclusively is able to download and print off images for keep sake, or for further investigations.

Block 600—The results may be relayed to the self-user 601, fertility health care 602 and/or the professional health care providers (consultants/practitioners) 603 via the computing device 406. Relaying the results may involve showing an image of the Ovum and or Ova and/or images provided in the back-end program for healthcare personnel only. In way of example but not exclusive, if a feature is placed in either the back-end and or both back-end and front end, t the app provides a notification for the user to contact their healthcare provider. The notification may be in a format so as not to alarm the user. Access to the back-end program is only available to healthcare providers.

FIG. 14 is a block diagram comprising illustrating components of an over-the-counter advance ovulation detection kit in accordance an embodiment of the present invention. An exemplary over-the-counter advance ovulation detection kit incorporates three integrated hardware components but not exclusively: (i) Remote Self-operated endocavitary probe (Tv-DAP) 100 that can be used anywhere with internet connection. (ii) Discrete package/container 1000 for ease of carrying and for transporting for personal use. (iii) Probe sleeve/lubricant 1001. The over-the-counter kit moves away from the clinical look of traditional ultrasound probes and is a more fun and engaging kit for both partners, providing the quality measurements and images proved in clinical settings.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A portable ultrasonic endocavitary imaging system for developing an image of a portion of a body cavity, configured for remote self-use, the system comprising:
   an elongate probe having a longitudinal axis, a distal end configured for insertion into the body cavity, a proximal end opposite to the distal end;
   a shaft rotatably mounted in the probe, in a manner supporting rotation about the longitudinal axis, and having a proximal end protruding from the proximal end of the probe and a distal end opposite to the proximal end;
   a handle pivotally attached to the proximal end of the shaft and configured to cause manual hand-operated rotation of the shaft within the probe, the shaft rotating with manual hand-operated rotation of the handle; and
   an image capture assembly, including:
      a piezo crystal array configured to rotate with the shaft about the longitudinal axis, the array coupled to the distal end of the shaft and having an axis aligned with the longitudinal axis, the array configured to cause capture of an ultrasound image of the interior of the body cavity lying in a plane through which the longitudinal axis passes, so that, when the shaft is rotated within the probe by means of the handle, the plane is correspondingly rotated about the longitudinal axis, causing generation of swept image data in the interior of the body cavity; and
      a radio frequency transceiver disposed in the probe and coupled to the piezo crystal array, the transceiver configured for transmitting the image data from the piezo crystal array to a computing device of a user.

2. An ultrasonic endocavitary imaging system according to claim 1, further comprising a switch, disposed in the handle, configured to cause operation of the image capture assembly.

3. An ultrasonic endocavitary imaging system according to claim 2, further comprising an indicator, disposed in the handle, configured to signal a state of the image capture assembly.

4. An ultrasonic endocavitary imaging system according to claim 3, wherein the indicator is a light.

5. An ultrasonic endocavitary imaging system according to claim 3, wherein the indicator is a vibratory transducer.

6. An ultrasonic endocavitary imaging system according to claim 1, further comprising:
   a first digital storage medium, encoded with first instructions that are configured to appear as an application on the user's computing device, and, when executed by a processor in the computing device, cause the computing device to receive the image data from the image capture assembly and to transmit first data, derived from the image data, over a wide area network to a server system; and
   a second digital storage medium, encoded with second instructions that are configured to execute on the server system, so as to cause the server system to perform computer processes including (i) receiving the first data, (ii) using machine learning to develop enhanced image data from the first data, and (iii) making the enhanced image data available to the user.

7. A system according to claim 6, wherein making the enhanced image data available to the user includes transmitting the enhanced image data to the user's computing device.

8. A system according to claim 6, wherein making the enhanced image data available to the user includes causing the enhanced image data to be downloadable from a web site.

9. A system according to claim 6, further comprising a shaft encoder, coupled to the shaft and to the image capture assembly, wherein the image capture assembly is configured to correlate the image data with shaft position, so that downstream processing of the image data by the server system can reflect orientation information provided by the shaft encoder.

10. A system according to claim 6, wherein the second instructions are additionally configured to cause the server system to perform computer processes including using machine learning to identify the presence of a feature in the enhanced image data.

11. A system according to claim 10, wherein the feature is an egg follicle.

12. A system according to claim 1, further comprising an electronic temperature sensor, mounted proximate to the distal end of the probe and coupled to the radio frequency transceiver, to cause the temperature of the body cavity to be transmitted to the computing device of the user.

* * * * *